J. A. WELTON.
DRIVE GEAR FOR MOTOR VEHICLES.
APPLICATION FILED OCT. 28, 1908.
934,117.
Patented Sept. 14, 1909.
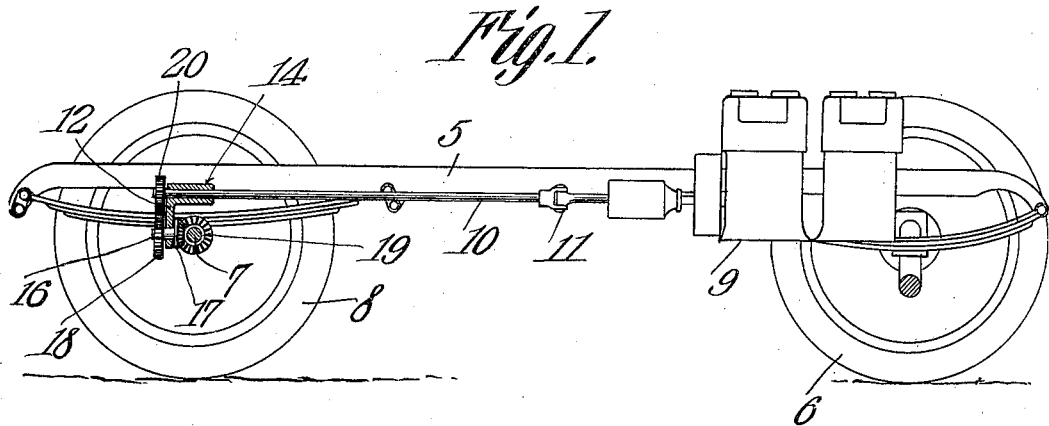
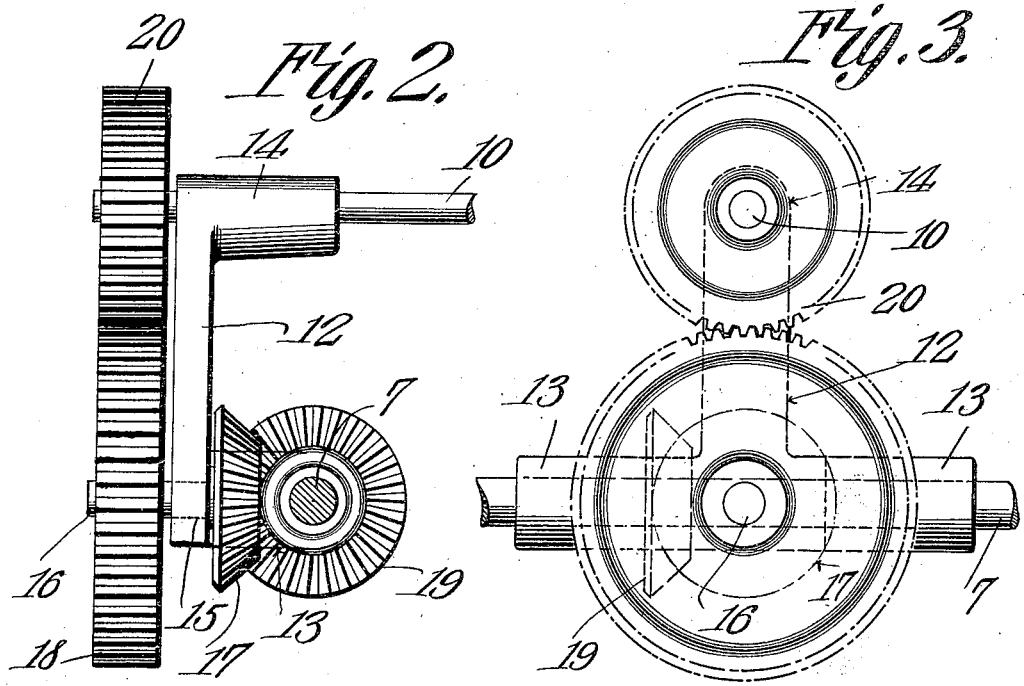
Witnesses
Inventor
John A. Welton.
By C. A. Snow & Co.
Attorneys

UNITED STATES PATENT OFFICE.

JOHN ALLEN WELTON, OF CANAL DOVER, OHIO.

DRIVE-GEAR FOR MOTOR-VEHICLES.

934,117.

Specification of Letters Patent. Patented Sept. 14, 1909.

Application filed October 28, 1908. Serial No. 459,932.

*To all whom it may concern:*

Be it known that I, JOHN ALLEN WELTON, a citizen of the United States, residing at Canal Dover, in the county of Tuscarawas and State of Ohio, have invented a new and useful Drive-Gear for Motor-Vehicles, of which the following is a specification.

This invention relates to that class of motor vehicles in which a longitudinal drive-shaft transmits motion to the rear axle.

The invention has for its object to make the connection between the drive-shaft and rear axle to the rear of the latter, so that when an obstacle is encountered, the rear wheels will more readily pass over the same, the effect of the connection being a lifting of the wheels in the direction of, and on the opposite side of the wheels from the obstacle, in the same manner as a chain drive. A further advantage of this arrangement is that the drive-shaft may be extended horizontally to the axle instead of slantingly.

In the accompanying drawings:—Figure 1 is a longitudinal sectional view of a motor vehicle, showing the application of the invention, only so much of said vehicle being shown as will suffice to show the connection of the invention therewith. Fig. 2 is a side elevation of the invention detached. Fig. 3 is an end view thereof.

5 denotes the chassis of the vehicle; 6, the front wheels; 7, the axle of the rear wheels 8; and 9 the engine. These parts are conventionally shown, as nothing is claimed with respect thereto.

The drive shaft 10 is in two sections, connected by a universal joint 11. The rear end of the shaft is supported by a bracket 12, mounted on the rear axle, said bracket having bearings 13, in which the axle turns, and bearings 14, in which the drive shaft turns. The bracket also has a bearing 15 for a stub shaft 16, which extends parallel to the drive shaft. On the stub shaft is a beveled pinion 17, and a spur gear 18. The pinion 17 meshes with the beveled pinion 19 of the differential on the rear axle, and the spur gear 18 meshes with a spur gear 20 on the rear end of the drive shaft. The gears 17, 18 and 20 are located to the rear of the axle 7, which has the effect of lifting of the wheels in the direction of an obstacle that may be encountered thereby and on the opposite side of the wheels therefrom, in the same manner as a chain drive. This is advantageous, as it enables the wheels to pass over the obstruction more readily. The gear also enables the drive shaft to be set horizontally, and a slant is avoided, whereby a more efficient drive is had, the universal joint 11 serving merely to allow the change of direction due to the jolting of the vehicle.

The gearing herein described is simple, and can be readily applied, and it effectually serves the purpose for which it is designed.

In practice, an oil tight casing will be provided, and minor changes, such as variations in the shape of the bracket 12, etc., may be resorted to without departing from the spirit of, or sacrificing any of the advantages of the invention.

Having thus described my invention, what I claim as new, and desire to secure, by Letters Patent, is:

In a motor vehicle, a drive shaft extending lengthwise of the vehicle, a drive axle, a bracket mounted on said axle and having a bearing for the drive shaft, a stub shaft carried by said bracket and extending parallel to the drive shaft, meshing spur gears on the stub shaft and the drive shaft, located to the rear of the axle, and gearing between the stub shaft and the axle.

In testimony that I claim the foregoing as my own, I have hereto affixed my signature in the presence of two witnesses.

JOHN ALLEN WELTON.

Witnesses:
ALICE E. SHAW,
F. H. SHAW.